United States Patent
Huttunen (10) Patent No.: US 6,353,913 B2
(45) Date of Patent: *Mar. 5, 2002

(54) MODULATION DETECTION METHOD AND APPARATUS

(75) Inventor: Mikko Huttunen, Espoo (FI)

(73) Assignee: Nokia Networks Oy, Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/439,805

(22) Filed: Nov. 12, 1999

Related U.S. Application Data (63) Continuation of application No. PCT/FI99/00218, filed on Mar. 22, 1999.

(30) Foreign Application Priority Data

Mar. 23, 1998 (FI) .................................. 980652

(51) Int. Cl.⁷ ............................................ H03M 13/03
(52) U.S. Cl. ........................ 714/796; 714/792; 714/794
(58) Field of Search ................................. 375/340, 261, 375/341, 355, 240.25; 714/796, 795, 794, 792, 780

(56) References Cited

U.S. PATENT DOCUMENTS

| | | | | |
|---|---|---|---|---|
| 4,247,944 A | * | 1/1981 | Sifford | 375/340 |
| 4,884,272 A | | 11/1989 | McConnell | 714/792 |
| 4,937,841 A | * | 6/1990 | Chuang et al. | 375/340 |
| 5,315,617 A | * | 5/1994 | Guida et al. | 375/261 |
| 5,384,810 A | * | 1/1995 | Amrany | 375/340 |
| 5,467,374 A | * | 11/1995 | Chennakeshu et al. | 375/340 |
| 5,479,419 A | | 12/1995 | Naoi et al. | 714/794 |
| 5,488,635 A | * | 1/1996 | Chennakeshu et al. | 375/340 |
| 5,588,028 A | * | 12/1996 | Parizhsky | 375/341 |
| 5,594,742 A | | 1/1997 | Hemmati | 714/792 |
| 6,005,898 A | * | 12/1999 | Kaewell, Jr. | 375/341 |
| 6,049,575 A | * | 4/2000 | Moridi | 375/355 |
| 6,141,384 A | * | 10/2000 | Wittig et al. | 375/240.25 |

FOREIGN PATENT DOCUMENTS

| | | |
|---|---|---|
| EP | 0731585 | 9/1996 |
| EP | 0786872 | 7/1997 |
| WO | WO 97/13327 | 4/1997 |

OTHER PUBLICATIONS

F. Adachi, "Reduced state Viterbi differential phase detection of MDPSK signals", Electronics Letters, vol. 32, No. 6, Mar. 14, 1996, pp. 527–529.
GSM 02.57 Version 7.1.0 Release 1998, ETSI TS 101.
International Search report for PCT/FI99/00218.

\* cited by examiner

Primary Examiner—David Ton
(74) Attorney, Agent, or Firm—Altera Law Group, LLC (57) ABSTRACT

A modulation detection method and apparatus, comprising taking a sample from a received signal, determining reference constellation points, calculating path-specific error metrics from a sample point to the reference constellation points, and applying the path-specific error metrics corresponding to the reference constellation points to a modulation detector. Out of the reference constellation points the constellation points, preferably two of them, having the smallest error metrics are selected, and only the error metrics corresponding thereto are applied to the modulation detector.

9 Claims, 6 Drawing Sheets

MODULATION DETECTION METHOD AND APPARATUS

This application is a continuation of international application serial number PCT/FI99/00218, filed Mar. 22, 1999.

BACKGROUND OF THE INVENTION

The invention relates to a modulation detection method comprising taking a sample from a received signal, determining reference constellation points, calculating path-specific error metrics from a sample point to the reference constellation points, and applying the path-specific error metrics corresponding to the reference constellation points to a modulation detector.

When information is transferred on a radio channel, the signal to be transmitted has to be subjected to modulation. Modulation converts the signal into a form in which it can be transmitted at radio frequency. A modulation method can be considered efficient for instance if it allows as much information as possible to be transferred at as narrow a frequency band as possible. Depending on the purpose of use, other features can also be emphasized. Modulation should also cause as little interference as possible to adjacent channels.

Figure 3A:
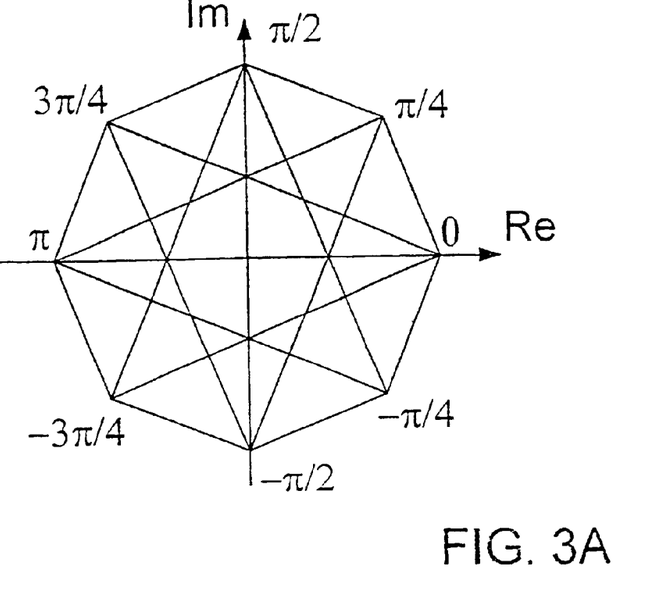
FIG. 3A is a phase shift diagram of $\pi/4$-DQPSK modulation.

Modulation methods include e.g. $\pi/4$-DQPSK ($\pi/4$-shifted, Differential Quaternary Phase Shift Keying) modulation. This modulation method comprises eight phase states, but only four phase shifts. Allowed phase shifts (symbols) are $\pm\pi/4$ and $\pm 3\pi/4$. FIG. 3A shows the modulation phase shift diagram (constellation). Each phase shift corresponds to two bits to be transmitted. In other words, a digital signal modulates the carrier in two-bit periods so that a given phase shift during each symbol period corresponds to a given two-bit combination. A symbol period refers to a signal period employed in the transmission of two bits. Phase shifts corresponding to bit combinations 00, 01, 10 and 11 are $\pi/4$, $3\pi/4$, $-\pi/4$ and $-3\pi/4$. The symbol frequency used in e.g. the TETRA system (Terrestrial Trunked Radio) is 18 kHz, the bit frequency being 36 kHz.

When a signal is being received, it has to be demodulated in order for the information therein to be detected. However, a signal transferred over the radio path can be distorted in various ways, thus complicating modulation detection. Signal-impairing phenomena include e.g. noise and intersymbol interference (ISI). A known solution to implement noise-tolerant modulation detection is an MLSE detector (Maximum Likelihood Sequence Estimation), which utilizes the generally known Viterbi algorithm, i.e. sequence detection. The Viterbi algorithm is a method of determining the most probable signal paths on the basis of path error metrics. Herein a signal path refers to different combinations of successive modulation symbols. In the MLSE detector such alternative signal paths are created and bits corresponding to a given signal period are detected at a delay based on the error metrics of a signal path composed of a plurality of successive modulation symbols, the path having the best metrics being selected from the alternative signal paths. The interference cancellation provided by the method is the better the more successive symbol periods the paths comprise. In fact, in this connection the term employed is detection depth, which refers to path length.

The problem in the above solution is that when the detection depth, i.e. the number of symbol periods included in the paths, is increased, the number of paths also increases. When e.g. $\pi/4$-DQPSK modulation is used, each symbol period comprises four different symbol alternatives, making the number of paths four-fold within each period. This, in turn, significantly increases the required computational capacity.

BRIEF DESCRIPTION OF THE INVENTION

It is an object of the invention to provide a method which solves the above problems. The objects of the invention are achieved by a method which is characterized by selecting out of the reference constellation points the constellation points, preferably two of them, having the smallest error metrics, and applying only the error metrics corresponding thereto to the modulation detector.

The invention is based on selecting, during each symbol period, the constellation points corresponding to symbols closest to a sample point taken from a signal. In e.g. $\pi/4$-DQPSK modulation, the sample point can be assumed at a very high probability to be either of the two closest constellation points, and consequently these two points are selected for further processing. The two remaining constellation points are discarded from further processing.

An advantage of the method of the invention is that since improbable alternatives are discarded at an initial stage, the calculation required can be reduced. This, in turn, allows an increase in detection depth at a given computational capacity.

The invention also relates to an apparatus for modulation detection, the apparatus comprising: means for taking a sample from a signal, means for determining reference constellation points and calculating path-specific error metrics from a sample point to the reference constellation points, the apparatus being adapted to use the path-specific error metrics corresponding to the reference constellation points in the modulation detector for detecting bits, the apparatus being characterized by being adapted to select out of the reference constellation points the constellation points, preferably two of them, having the smallest error metrics and to use only the error metrics corresponding thereto in the modulation detector. Such an apparatus serves to achieve the advantages offered by the modulation detection method of the invention by a simple structure.

BRIEF DESCRIPTION OF THE DRAWINGS

The invention will be described in greater detail by means of preferred embodiments with reference to the attached drawings, in which.

DETAILED DESCRIPTION OF THE INVENTION

In the following the invention will be described in the TETRA system, but the invention is not to be restricted to any given system or modulation method.

Figure 2:
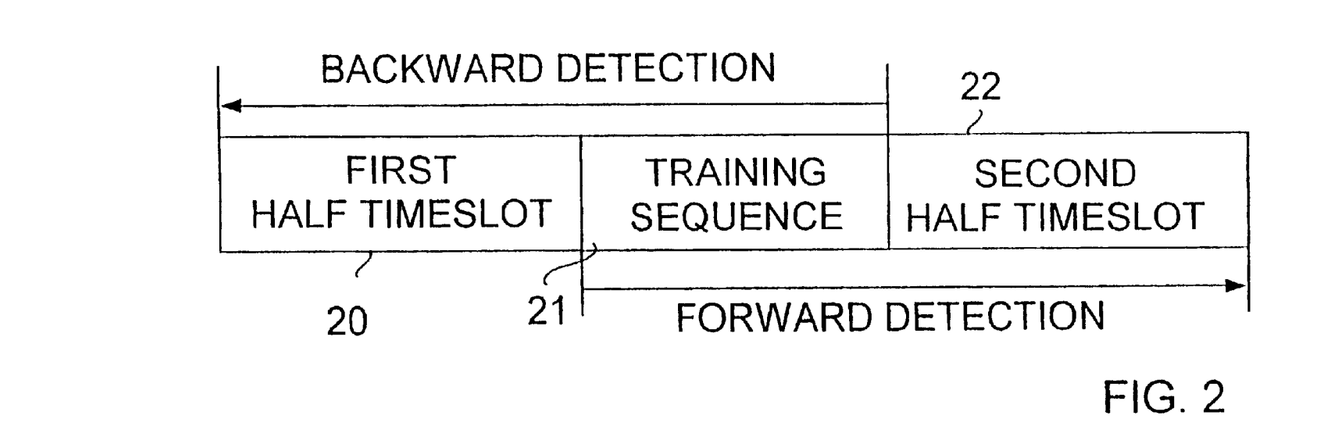
FIG. 2 is a simplified diagrammatic plan of a frame structure of the TETRA system.

In the TETRA system, information bits received from the management layer MAC (Medium Access Layer) are coded by block coding and convolution coding in order to be able to detect and possibly correct errors generated in the signal on the radio path. The coded bits are interleaved in such a way that successive bits are far apart. This facilitates error correction, should the signal to be transmitted be subjected to momentary interference on the radio path. The interleaved bits are mixed by a given colour code allowing the identification of transmissions by different base stations. In multiplexing, the bits of different logical channels are combined. The multiplexed bits are then used to form a burst. A burst is a structure sent in one TDMA (Time Division Multiple Access) timeslot or subtimeslot. A burst is composed of data bit fields 20 and 22 and a training sequence 21 between them in the middle of the burst as is shown in FIG. 2. Differential coding generates modulating symbols from the bit pairs of a burst. A carrier modulated by symbol control is amplified in a transmitter and transmitted to the radio path.

Figure 3B:
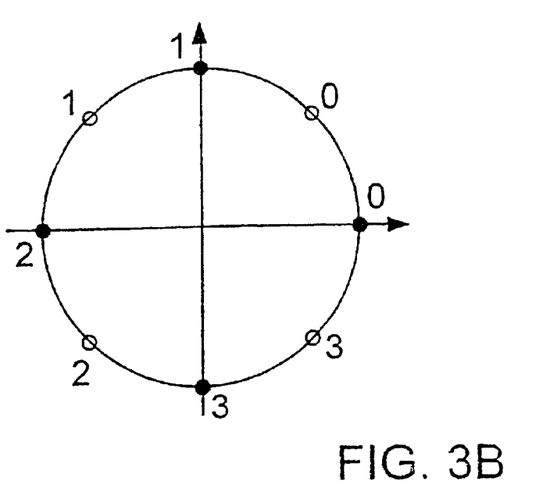
FIG. 3B shows the constellation points of $\pi/4$-DQPSK modulation.

The modulation employed is the above described $\pi/4$-DQPSK ($\pi/4$-shifted, Differential Quaternary Phase Shift Keying) modulation. This modulation method comprises eight phase states, but only four phase shifts. Allowed phase shifts (symbols) are $\pm\pi/4$ and $\pm3\pi/4$. In practice the $\pi/4$-DQPSK constellation thus varies at intervals of a symbol between two 4-point constellations, illustrated in FIG. 3B by four black points ($1^{st}$ constellation) and four white points ($2^{nd}$ constellation). As the symbol period changes, a shift may occur only from a white point to a black point and from a black point to a white point. Each of these eight constellation points can be represented by numbers 0 to 3, as is shown in FIG. 3B. Non-idealities of a radio channel may cause constellation points to shift.

Figure 1:
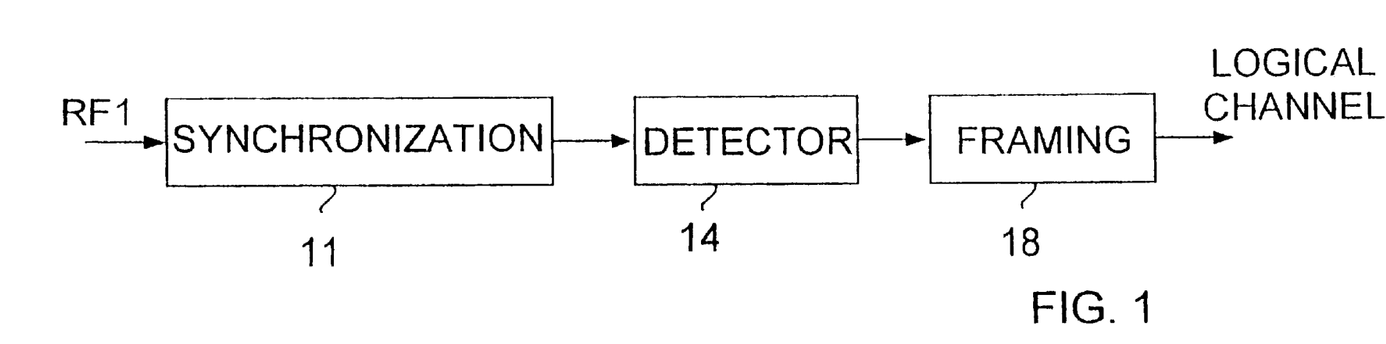
FIG. 1 is a block diagram of a reception structure according to the TETRA system.

FIG. 1 is a block diagram of a receiver structure according to the invention for e.g. the TETRA system. Only the receiver parts essential to the description of the invention are shown. Upon reception, a signal is received from an antenna (not shown) and radio-frequency parts first process the signal. Samples are then taken with an A/D converter (not shown) from an intermediate-frequency signal. The samples are applied to a synchronization block 11, as is illustrated in FIG. 1 by a signal RF1. The synchronization block 11 searches the obtained samples for the training sequence associated with the frame structure and uses it to accurately determine the sampling moment, i.e. locations of all symbols in the sample flow. The synchronization block also controls the radio-frequency parts of the receiver so as to maintain a signal arriving at the A/D converter at an optimal level. The synchronization block applies the frame to a channel equalizer and detector block 14. The channel equalizer equalizes non-idealities caused by the radio path channel and the associated detector detects the information bits. Finally a logical channel is formed from the frame in framing 18 and send to further processing.

In the above an example of the general structure of a receiver has been described to facilitate understanding the invention. However, the structure of the receiver may change without deviating from the present invention, which is directed to the MLSE detector of a receiver.

Figure 4:
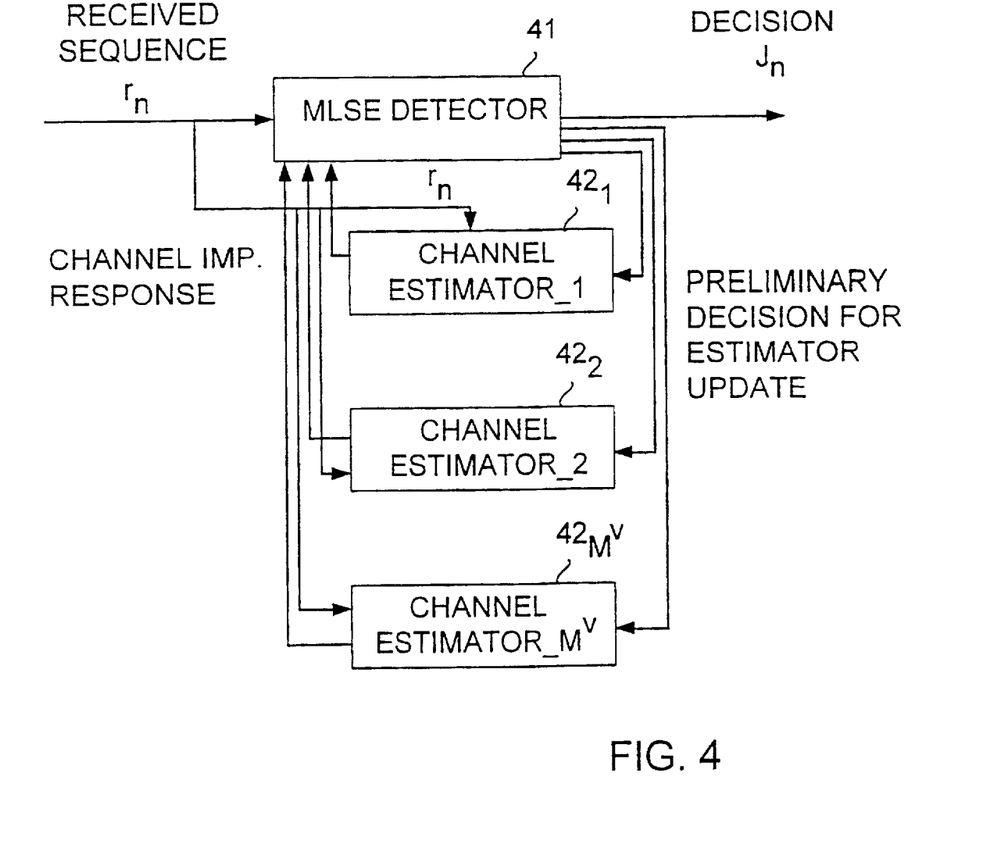
FIG. 4 is a block diagram of an adaptive MLSE detector and related channel estimators in accordance with an embodiment.

In a primary embodiment of the invention the MLSE detector is provided with the Viterbi algorithm. An adaptive MLSE detector thus comprises a Viterbi detector 41 and at least one adaptive channel estimator $42_a$ (a=1 to $M^V$), as is shown in FIG. 4. The Viterbi detector 41 estimates a transmitted sequence $r_n$, by means of a description created by the channel estimator $42_a$ of the impulse response of the radio channel. The channel estimator $42_a$ adaptively estimates the impulse response of the radio channel by means of decisions $J_n$, produced by the Viterbi detector 41 or by means of preliminary decisions. In accordance with the invention, one channel estimate corresponds to each sequence of the Viterbi detector. These estimates can be realized by one common channel estimator, but this would impair the tracing capability of the channel estimator. The embodiment shown in FIG. 4 comprises a plurality of parallel channel estimators $42_a$, preferably as many as there are sequences.

It is typical of the radio path that a transmitted signal arrives at a receiver along a plurality of propagation paths, each having a specific time delay, channel properties also changing as a function of time. E.g. beams reflected and delayed on the radio path cause so-called inter-symbol interference (ISI). The frequency response or impulse response of a channel can be estimated by a discrete-timed filter, a channel estimator, whose tap coefficients model the radio channel. A channel estimator is used to describe the state of a radio channel.

In the present description a channel estimator refers generally to a mechanism for estimating and maintaining a description of the complex impulse response of a radio channel. A method of updating the channel estimate is an essential part of this mechanism. In the TETRA system, the LMS (Least Mean Square) algorithm can be used to update channel estimates. In order to ensure the convergence of the LMS algorithm before the beginning of actual information bits, the detector 14 has to get an optimal initial estimate for the state of the channel. This estimate is obtained from the synchronization 11, which, when searching for an optimal sampling moment, calculates a complex cross correlation between the training sequence 21 of a received signal and a stored version of the training sequence. As a result of the cross correlation result, an initial value is obtained for the channel estimate, the value depicting the average state of the channel during a training sequence. Channel equalization and symbol detection is never started until the training sequence has been received. This is because symbol synchronization is able to adjust symbol timing as accurately as possible and generate an initial channel estimate. Both forward and backward channel equalization is performed after estimate initialization by always training the detector 14 across the training sequence 21 towards the end of the burst or, correspondingly, towards the beginning, as FIG. 2 shows.

The Viterbi algorithm is a method of searching for a trellis for a signal path corresponding to maximum probability among a number of signal paths, in which one channel estimate corresponds to each signal path. At each stage of the trellis search, $M^L$ sequences propagate in the detector, each of which has specific path metrics based on Euclidean distance. The main idea of MLSE detection is the attempt to construct a reference constellation point on the basis of information on, i.e. the channel estimate for, the current state of the channel. Once the reference constellation point has been calculated and selected on the basis of the best signal path, the difference between the reference point and the received sample can be calculated for each channel estimate. This error can be used to update the channel estimator. Because computational complexity increases exponentially as a function of the length L, a practical implementation of the detector is only feasible at relatively low values of M and L. In e.g. cellular radio systems in which speech is transferred, low values for M and L are often selected, e.g. M=4 and L=2.

Figure 5:
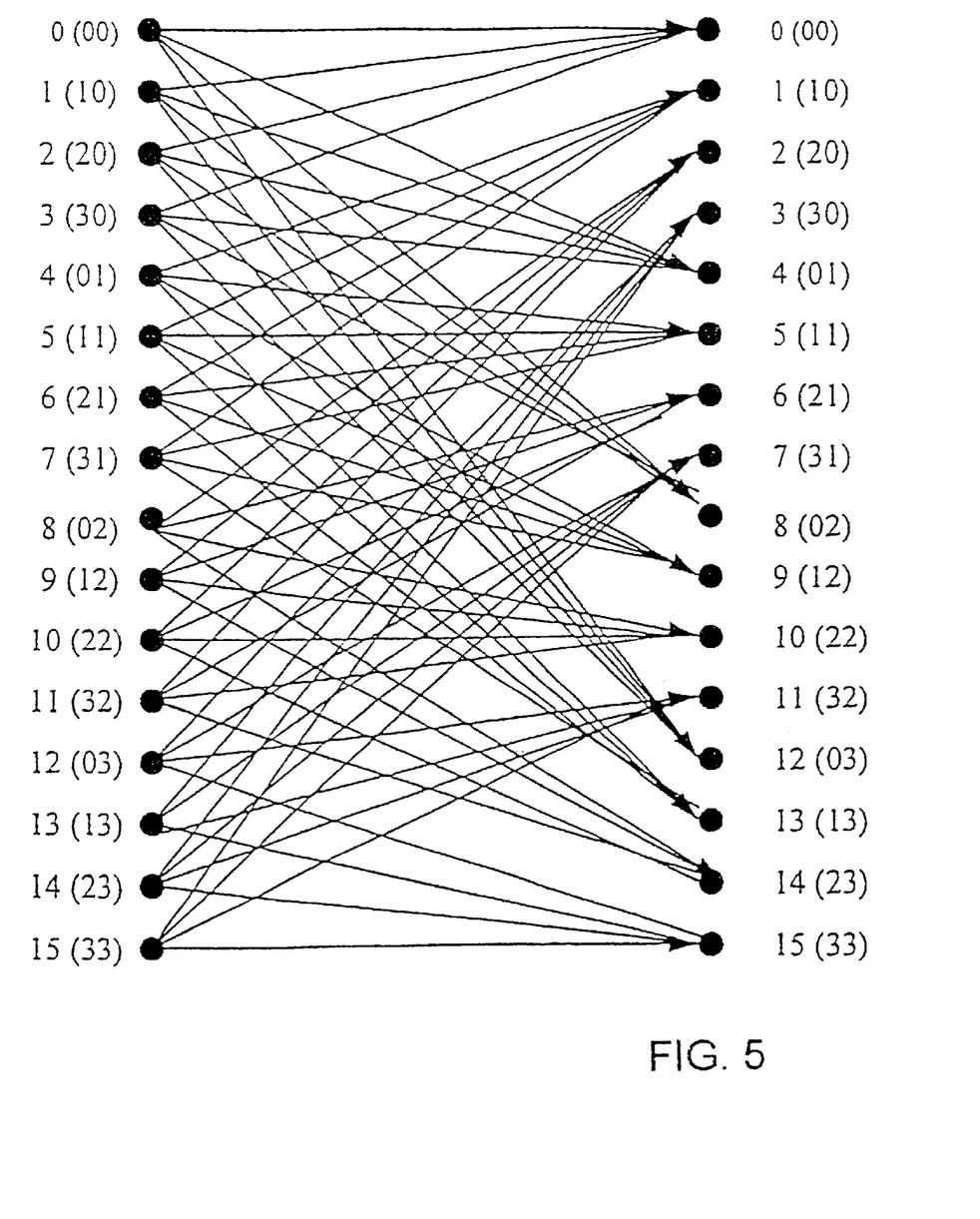
FIG. 5 is a trellis diagram of a 16-state detector.

In the constellation of FIG. 3B, for example, M=4. If the channel estimate depicts the combined effect of a previous, current and coming symbol, then L=2. In this case the number of different constellation point combinations, i.e. states, is 16. This requires a 16-state detector whose trellis diagram is shown in FIG. 5. Shifts are shown from the white constellation to the black one. Consequently, each state will include four paths, the best of which will be selected for further processing.

Figure 6:
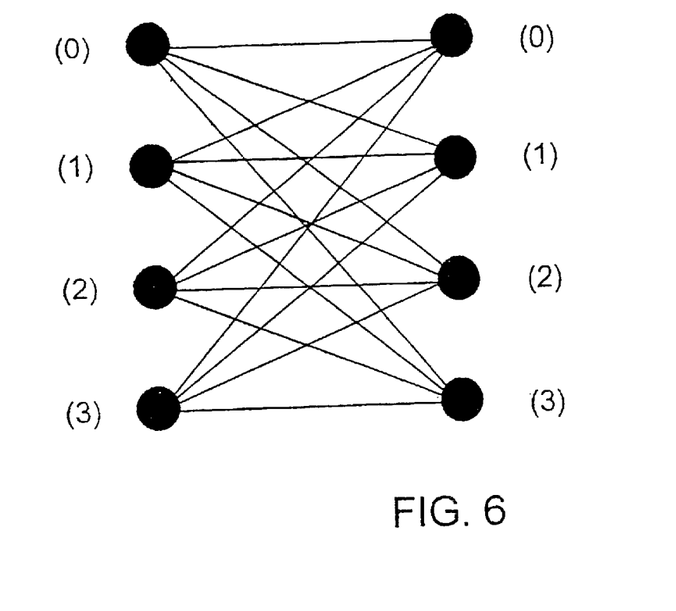
FIG. 6 is a trellis diagram of a 4-state detector.

FIG. 6 shows the trellis diagram of a 4-state Viterbi detector, in which the constellation varies at intervals of a symbol between two four-point constellations, as is the case in a 16-state detector, too (M=4). The definition of a state differs from a 16-state detector in that the state is determined only by the current constellation point, not two successive ones, i.e. L=1. Black points depict alternative modulation symbols and are numbered from 0 to 3.

FIG. 6 shows that when the method of the invention is not used, 4*4=16 paths form during only two symbol periods. Paths alternatives 1 to 16 are:

| 1: 00 | 5: 01 | 9: 02  | 13: 03 |
| 2: 10 | 6: 11 | 10: 12 | 14: 13 |
| 3: 20 | 7: 21 | 11: 22 | 15: 23 |
| 4: 30 | 8: 31 | 12: 32 | 16: 33 |

FIGS. 5 and 6 clearly show how the length or depth L of the detection significantly affects the complexity of the calculation. On the other hand, the longer the length L, the better the accuracy in selection of the best path.

In accordance with the invention, the calculation required can be reduced by selecting from the reference constellation points defined at a given stage of the trellis search a few, preferably two, constellation points having the least error metrics. At the next stage of the trellis search, only these selected reference points will be used instead of all of them, as in conventional MLSE detectors. Less calculation can be directly utilized as lower performance requirements for the equipment (usually a signal processor), lowering the price and power consumption of the equipment, or as calculation of longer signal paths, improving the accuracy of the detection.

In the following the detection of the invention will be described by means of an example.

At first a synchronization block applies an initial estimate for the radio channel to an estimator. Backward detection over a training sequence 21 and a first half timeslot 20 and, correspondingly, forward detection over the training sequence 21 and a second half timeslot 22 is then performed.

In backward detection, the MLSE detector starts to detect the bits of the training sequence 21 backwards starting from the end of the training sequence towards the beginning of the burst, as FIG. 2 illustrates. On the basis of the training sequence the MLSE detector forms alternative signal paths, the number depending on the detection depth employed. When the first IQ sample has been taken after the training sequence when detecting actual information bits, reference constellation points are determined on the basis of the channel estimate corresponding to the best known signal path. The best known path is the path whose error metrics (the combined error metrics of the points on the path) are the lowest, and accordingly the corresponding channel estimate is probably the closest to the actual state of the channel.

Next, error metrics from the sample point to each of the four reference constellation points are calculated. Of these four reference constellation points, two points having the least error metrics are selected for further study. When the best two constellation points have been selected on the basis of the channel estimate for the best path, the constellation point having the best metrics N over a symbol period is denoted by the numeral 0 and the second best constellation by the numeral 1. Path-specific reference constellation points corresponding to these two selected points are determined for the other paths. This reduces the need for calculation, since all four reference constellation points have to be determined only for the best path, and only two for the other paths. Next the error metrics of the paths are calculated by adding the error metrics corresponding to the two selected constellation points, each separately, to the error metrics of the paths. Consequently, two new paths are obtained for each old path. Finally the obtained path-specific error metrics are applied to a Viterbi detector, which selects the best paths for further processing. Thus the number of active paths remains constant, since the detector discards half of the paths. The above described process continues starting with the taking of a new sample IQ until all information bits of the first half timeslot have been gone through.

Figure 7:
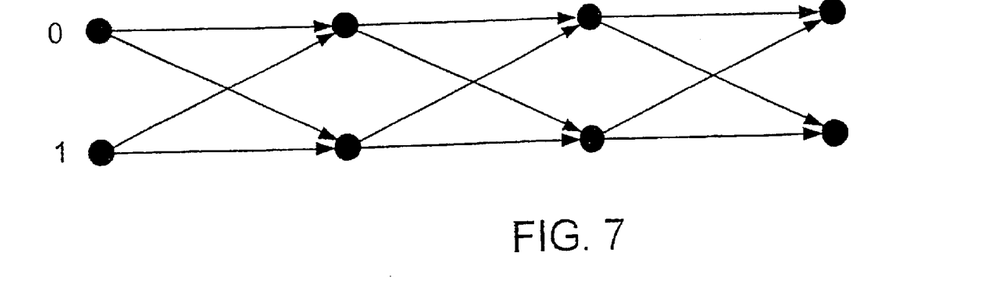
FIG. 7 shows formation of signal paths in the course of four symbol periods with two constellation point alternatives.

FIG. 7 shows a diagram of the formation of signal paths in a situation where the method of the invention is being used. There are only two modulation symbols, labelled 0 and 1, for each symbol period, the number of paths being $2^N$, wherein N is the number of symbol periods to be taken into consideration. In the case of FIG. 7, 16 different path alternatives are obtained during four symbol periods, these being:

| 1: 0000 | 5: 0100 | 9: 1000  | 13: 1100 |
| 2: 0001 | 6: 0101 | 10: 1001 | 14: 1101 |
| 3: 0010 | 7: 0110 | 11: 1010 | 15: 1110 |
| 4: 0011 | 8: 0111 | 12: 1011 | 16: 1111 |

Figure 8:
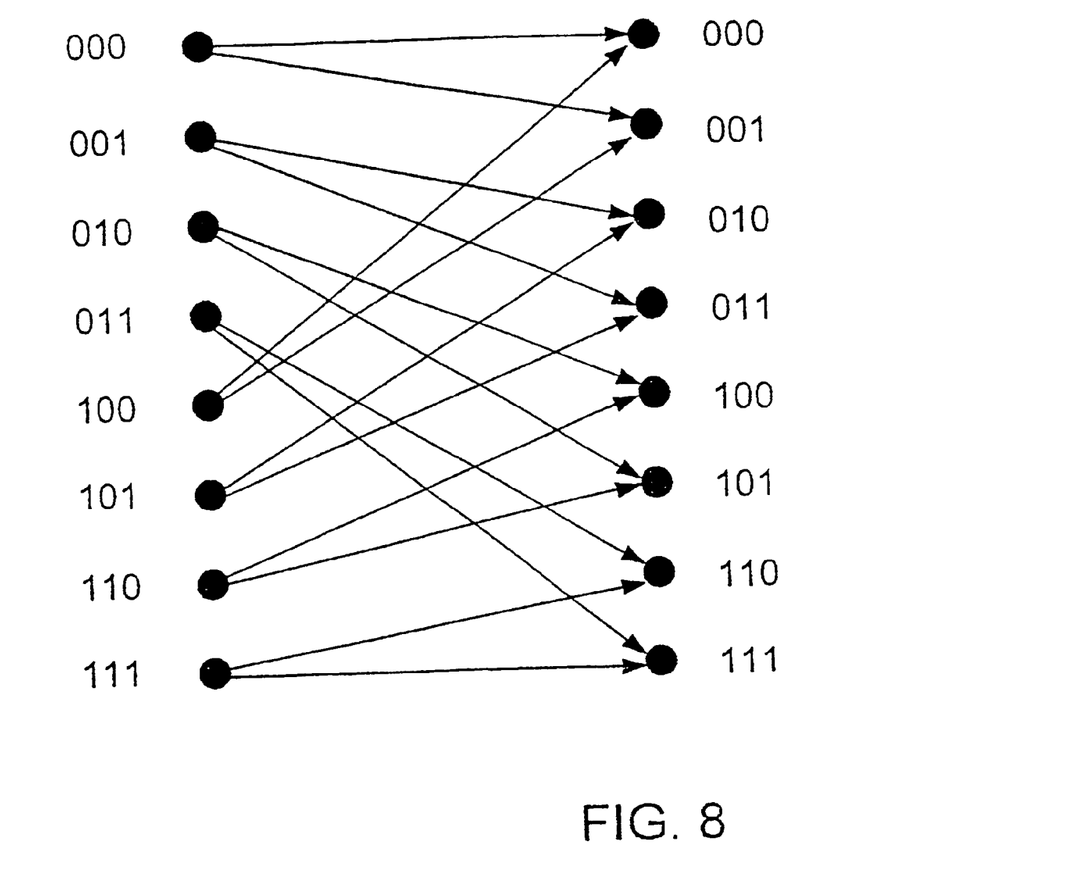
FIG. 8 is a trellis diagram of an embodiment of the invention.

FIG. 8 shows a trellis diagram illustrating system states and state shifts in the above described case where the method of the invention is used in accordance with an embodiment.

On the basis of the above it can be stated that when the required computational capacity depends on the number of paths to be processed, detection depth can be increased significantly at a given computational capacity by discarding improbable symbol alternatives at the start of processing.

When the above described process has reached the beginning of the first half timeslot 20, the path having the best metrics over the entire first half timeslot 20 of the burst is selected out of the active paths, and this path is then traced back up to the beginning of the training sequence 21. Symbol detection is carried out during the backtracing procedure.

In forward detection, the MLSE detector starts to detect the bits of the training sequence 21 forward starting from the beginning of the training sequence towards the end of the burst, as FIG. 2 illustrates. The search for the best path continues as described above until the end of the second half timeslot 22 is reached. Then the path having the best metrics over the entire second half timeslot 22 of the burst is selected, and this path is then traced back up to the end of the training sequence 21. Symbol detection is carried out during the backtracing procedure.

At this point all bits of the burst have been detected.

Even though this embodiment description describes the utilization of the method of the invention in the TETRA system employing π4-DQPSK modulation, it does in no way restrict the use of the method of the invention also in other types of systems. Consequently, the modulation method employed can be another method and similarly, another detection algorithm may be used instead of the Viterbi algorithm.

It is obvious to a person skilled in the art that as technology advances, the inventive concept can be implemented in several different ways. Thus the invention and its embodiments are not limited to the examples described above, but may vary within the scope of the claims.

What is claimed is:

1. A modulation detection method comprising:

taking a sample from a received signal, determining reference constellation points, calculating error metrics from a sample point to the reference constellation points, selecting out of the reference constellation points the constellation points having the smallest error metrics, calculating signal path-specific error metrics corresponding to the selected reference constellation points, and applying only the path-specific error metrics corresponding to the selected reference constellation points to a modulation detector which selects the best signal paths from alternative signal paths for further processing based on the path-specific error metrics applied thereto.

2. The method as claimed in claim 1, wherein selecting the constellation points, the error metrics corresponding to which are applied to the modulation detector, for all paths, on a basis of the error metrics corresponding to the reference constellation points determined on a basis of a channel estimate corresponding to a best known path.

3. The method as claimed in claim 2, wherein determining the reference constellation points path-specifically on the basis of the channel estimate corresponding to each path.

4. The method as claimed in claim 3, wherein determining for the other paths only path-specific reference constellation points, which correspond to the selected constellation points and the corresponding error metrics, after the constellation points having the smallest error metrics have been selected on the basis of error metrics corresponding to the reference constellation points determined on the basis of the channel estimate corresponding to the best known path.

5. The method as claimed in claim 1, wherein the modulation detector being a Viterbi detector.

6. The method as claimed in claim 1, wherein reading from a received signal a training sequence, forming initial estimates for the state of the channel on the basis of the training sequence, reading a first half timeslot, forming alternative signal paths, selecting the signal path having best error metrics, detecting bits corresponding to the best signal path in the first half timeslot, reading from the received signal the training sequence, forming initial estimates for the state of the channel on the basis of the training sequence, reading a second half timeslot, forming alternative signal paths, selecting the signal path having best error metrics, and detecting bits corresponding the best signal path in the second half timeslot.

7. An apparatus for modulation detection, the apparatus comprising:

means for taking a sample from a signal, means for determining reference constellation points, calculating error metrics from a sample point to the reference constellation points, and calculating signal path-specific error metrics corresponding to the reference constellation points, a modulation detector which selects the best paths from alternative signal paths for further processing based on path-specific error metrics applied thereto, the apparatus selects out of the reference constellation points the constellation points having the smallest error metrics and to apply only the path-specific error metrics corresponding to the selected reference constellation points to the modulation detector.

8. The apparatus as claimed in claim 7, wherein being adapted to select the constellation points, the error metrics corresponding to which being applied to the modulation detector, for all paths on a basis of the error metrics corresponding to the reference constellation points determined on a basis of a channel estimate corresponding to a best known path.

9. The apparatus as claimed in claim 8, wherein being adapted to determine the reference constellation points path-specifically on the basis of a channel estimate corresponding to each path.

* * * * *